United States Patent
Marking et al.

(10) Patent No.: US 7,846,352 B2
(45) Date of Patent: Dec. 7, 2010

(54) METHOD OF PRODUCING UV-EMITTING MAGNESIUM PENTABORATE PHOSPHORS

(75) Inventors: Gregory A. Marking, Sayre, PA (US); Chen-Wen Fan, Sayre, PA (US); Thomas M. Snyder, Laceyville, PA (US)

(73) Assignee: OSRAM Sylvania Inc., Danvers, MA (US)

(*) Notice: Subject to any disclaimer, the term of this patent is extended or adjusted under 35 U.S.C. 154(b) by 554 days.

(21) Appl. No.: 12/030,247

(22) Filed: Feb. 13, 2008

(65) Prior Publication Data

US 2008/0213152 A1    Sep. 4, 2008

Related U.S. Application Data

(60) Provisional application No. 60/892,326, filed on Mar. 1, 2007.

(51) Int. Cl.
C09K 11/55 (2006.01)
C09K 11/77 (2006.01)
C09K 11/63 (2006.01)

(52) U.S. Cl. ............................... 252/301.4 R
(58) Field of Classification Search ........... 252/301.4 R
See application file for complete search history.

(56) References Cited

U.S. PATENT DOCUMENTS

| | | | |
|---|---|---|---|
| 4,319,161 A | 3/1982 | Looye et al. | |
| 4,719,033 A | 1/1988 | Chenot et al. | |
| 5,068,055 A | 11/1991 | Chenot et al. | |
| 5,612,590 A | 3/1997 | Trushell et al. | |
| 6,007,741 A | 12/1999 | Hunt, Jr. et al. | |
| 6,085,971 A | 7/2000 | Tews et al. | |
| 6,794,810 B2 | 9/2004 | Gruber et al. | |
| 7,138,757 B2 | 11/2006 | Tóth et al. | |
| 7,221,084 B2 | 5/2007 | Fan et al. | |
| 7,259,509 B2 | 8/2007 | Meiss et al. | |
| 7,288,215 B2 | 10/2007 | Fan et al. | |

OTHER PUBLICATIONS

Lehamnn et al, "Uber die Hydrate des Magnesium(1:3)-borates, MgB6O10 xH2O", Z. Anorg. Alig. Chem. 350, pp. 168-176 (1967), article and translation.*
Lehmann et al, "Uber ein wasserhaltiges Magnesiumhexaborat der Formel MgB6O10 x5H2O", Z. Anorg. Alig. Chem. 350, pp. 168-176 (1967), article and translation.*
U.S. Appl. No. 12/030,374, filed Feb. 13, 2008.
U.S. Appl. No. 12/030,336, filed Feb. 13, 2008.

* cited by examiner

Primary Examiner—C. Melissa Koslow
(74) Attorney, Agent, or Firm—Robert F. Clark

(57) ABSTRACT

A method of producing a UV-emitting magnesium pentaborate phosphor is described. The method comprises combining a hydrated magnesium hexaborate with oxides of Y, Gd, Ce and Pr to form a mixture and firing the mixture in a slightly reducing atmosphere to form the phosphor. The hydrated magnesium hexaborate, which is preferably prepared as a precipitate, preferably has a formula $MgB_6O_{10} \cdot XH_2O$ where X is from 4 to 6.

22 Claims, 2 Drawing Sheets

METHOD OF PRODUCING UV-EMITTING MAGNESIUM PENTABORATE PHOSPHORS

CROSS REFERENCES TO RELATED APPLICATIONS

This application claims the benefit of U.S. Provisional Application No. 60/892,326, filed Mar. 1, 2007, which is incorporated herein by reference.

TECHNICAL FIELD

This invention relates to methods of producing UV-emitting pentaborate phosphors, which are narrow-band ultraviolet-emitting phosphors typically used in low-pressure mercury vapor discharge lamps for phototherapy purposes.

BACKGROUND OF THE INVENTION

The use of ultraviolet (UV) radiation for phototherapy is well established. In fact, UV therapy is now involved in the treatment of more than 40 types of skin diseases and disorders, such as psoriasis, vitiligo, and eczema. Phototherapy studies of UVB wavelengths between 260 nm and 320 nm found that a narrow-band UV emission centered at approximately 312 nm is most effective for phototherapy while at the same time limiting undesirable erythemal effects. Since the skin's erythemal (or sunburning sensitivity) is at its maximum at about 297 nm, a narrow-band emission at about 312 nm allows a patient to have longer treatment times before an erythemal response appears.

One known UV-emitting phosphor is a magnesium pentaborate sensitized with cerium, e.g., $(Gd_{0.45},Y_{0.5})MgB_5O_{10}$:$Ce_{0.05}$, which is described in U.S. Pat. No. 4,319,161. The method of producing Ce-activated magnesium pentaborate phosphor involves dry mixing boric acid and oxides of Gd, Y, Ce, and Mg, and then subjecting the mixture to three firings in a weakly reducing atmosphere. Later in U.S. Pat. No. 6,007,741, Hunt et al. described an improved process to prepare the $(Gd_{0.45},Y_{0.5})MgB_5O_{10}$:$Ce_{0.05}$ phosphor by milling the reactants in a saturated aqueous solution of magnesia and boric acid prior to firing three times. The later method was developed to increase the homogeneity of the fired phosphor cake and reduce the tendency of the fired cake to stick to the firing boats. Even more recently in U.S. Pat. No. 7,288,215, Fan et al. describe an improved method of making $(Gd_{0.45},Y_{0.49})MgB_5O_{10}$:$Ce_{0.05},Pr_{0.01}$ UV-emitting phosphors that involves mixing boric acid, magnesia and a previously prepared co-precipitate of (Gd,Y,Ce,Pr) oxide and then subjecting the mixture to two firing steps in a weakly reducing atmosphere. Although the use of the mixed oxide co-precipitate improves homogeneity and yields a phosphor having a higher brightness, this process still uses excess boric acid as the boron source.

For all the processes mentioned above, the material after the first firing is commonly inhomogeneous due to melting and separation of the boric acid raw material. The fired cake subsequently needs to be washed, milled, re-blended with additional boric acid for the second or third firing step. This repeated grinding and firing is labor intensive and the large quantity of boric acid can contaminate the furnace.

Unlike the above methods, U.S. Pat. Nos. 4,719,033 and 5,068,055 describe a single-step firing process for making europium-activated strontium tetraborate, $SrB_4O_7$:Eu, a UVA-emitting phosphor. The process involves adding a $SrCO_3/Eu_2O_3$ mixture to an $H_3BO_3$ slurry at >90° C. to form a $(Sr,Eu)B_6O_{10}.5H_2O$ precipitate along with excess $SrCO_3/Eu_2O_3$ in a 2:1 ratio. The precipitate is then fired to yield the $SrB_4O_7$:Eu phosphor. No boric acid is used in the firing step. The hydrated precipitate is fired after drying without adding additional compounds.

It would be advantageous to have a firing process for making the UV-emitting magnesium pentaborate phosphors which avoids the use of excess boric acid and does not require multiple firing steps.

SUMMARY OF THE INVENTION

It is an object of this invention to obviate the disadvantages of the prior art.

It is a further object of this invention to provide an improved method of producing UV-emitting magnesium pentaborate phosphors.

In accordance with these and other objects of the invention, there is provided a method of producing a UV-emitting magnesium pentaborate phosphor which preferably has a composition that may be represented by the general formula $(Y_{1-x-y-z}Gd_xCe_yPr_z)MgB_5O_{10}$ where x has a value from 0.02 to 0.80, y has a value from 0.01 to 0.97, and z has a value from 0 to 0.05 and x+y+z<1. More preferably, x has a value from 0.3 to 0.6, y has a value from 0.02 to 0.2, and z has a value from 0.002 to 0.02.

In a preferred embodiment, the method of this invention involves the use of a hydrated magnesium hexaborate as a boron source, preferably in place of boric acid. The hydrated magnesium hexaborate preferably may be represented by the formula $MgB_6O_{10}.XH_2O$ where X is from 4 to 6, preferably 4.8 to 5.5, and more preferably about 5. The hydrated magnesium hexaborate is combined with oxides of Y, Gd, Ce and Pr and fired in a slightly reducing atmosphere. Preferably, the mixture is fired at a temperature from about 1020° C. to about 1060° C. for 3.0 to 4.0 hours in a slightly reducing 99% $N_2$/1% $H_2$ atmosphere to form the pentaborate phosphor.

In a preferred method, the hydrated magnesium hexaborate is prepared as a precipitate by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour.

In a more preferred method, the boric acid solution contains about 6.0 to about 12.0 millimoles of boric acid per 1.0 milliliter of water and about 1.0 to about 2.0 millimoles of magnesium carbonate per 1.0 milliliter water is added. More preferably, the boric acid solution contains about 9.0 to about 10.0 millimoles of boric acid per 1.0 milliliter of water and about 1.5 to about 1.67 millimoles of magnesium carbonate per 1.0 milliliter water is added. The molar ratio of $H_3BO_3$ to $MgCO_3$ used to produce the precipitate is preferably 5.75 to 6.25 and more preferably about 6.0.

DETAILED DESCRIPTION OF THE INVENTION

Figure 1:
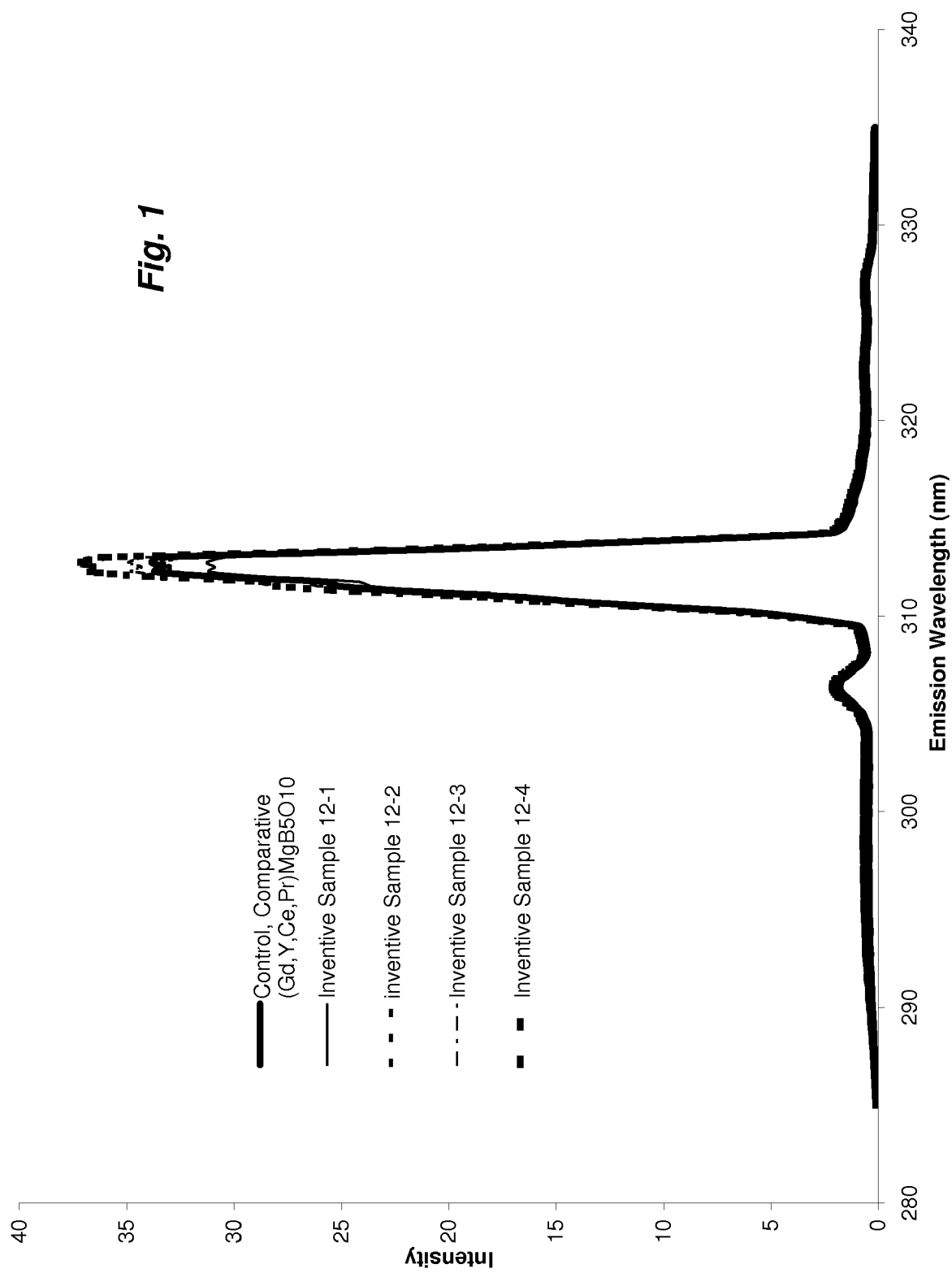
FIG. 1 shows the emission spectra between 280 nm and 340 nm of a standard $(Gd_{0.45},Y_{0.49},Ce_{0.05},Pr_{0.01})MgB_5O_{10}$ phosphor and phosphors in Example 12.

For a better understanding of the present invention, together with other and further objects, advantages and capabilities thereof, reference is made to the following disclosure and appended claims taken in conjunction with the above-described drawings.

The method of this invention utilizes a hydrated magnesium hexaborate as a boron source in the preparation of UV-emitting magnesium pentaborate phosphors. The hydrated magnesium hexaborate, which is preferably prepared as a precipitate, is combined with oxides of Y, Gd, Ce, and Pr, and fired once in a slightly reducing atmosphere. This is different from the prior art methods which combine separate oxide powders or a co-precipitate of (Gd, Y, Ce, Pr) oxide and magnesium carbonate with large amounts of boric acid. The new method results in a greater homogeneity of the fired cake and subsequently a higher brightness. In addition, the new method requires only one firing step and provides no or very little sticking of the fired cake to the firing boats.

The reported literature syntheses of $MgB_6O_{10}.XH_2O$ (X=5, 6, 7, and 7.5) were directed at the preparation of single crystals for structural determination, although the structure has not been published. See, Lehmann and Rietz, Z. Anorg. Allg. Chem., 350, 168-176 (1967) and Lehmann and Papenfuss, Z. Anorg. Allg. Chem., 301, 228-232 (1959). A typical synthesis included small quantities and lengthy reaction times. For example, 1.5 grams of MgO and 60 grams of $H_3BO_3$ were agitated in 150 ml of $H_2O$ at 80° C. for 15 to 20 days to produce single crystals of $MgB_6O_{10}.7H_2O$. Neither the small quantities nor the lengthy reaction times are desirable for commercial manufacturing. However, it was determined that by using magnesium carbonate instead of magnesium oxide it was possible to manufacture commercial quantities of $MgB_6O_{10}.XH_2O$.

As used herein, the term "magnesium carbonate" and its general chemical formula "$MgCO_3$" are to be broadly construed to include more complex hydrated carbonate forms such as $Mg_5(CO_3)_4(OH)_2(H_2O)_4$.

In one alternative embodiment, the hydrated magnesium hexaborate is formed by first dissolving about 6.0 to about 12.0 millimoles of boric acid per 1.0 milliliter of de-ionized water. The slurry is agitated and heated to about 90° C. Secondly, about 1.0 to about 2.0 millimoles of magnesium carbonate per 1.0 milliliter of de-ionized water are slowly added into the heated solution and the precipitate is digested for up to 10 minutes at about 90° C. The temperature is then lowered to about 35° C. to about 70° C. and maintained within the lower temperature range for at least about one hour. The molar ratio of $H_3BO_3$ to $MgCO_3$ used to produce the precipitate is preferably 5.75 to 6.25 and more preferably about 6.0. Observation indicates that hydrated magnesium hexaborate has a significant solubility in water. Increasing the concentrations of $H_3BO_3$ and $MgCO_3$ tends to increase the yield of the precipitate. However, when the concentrations are too high, the precipitate becomes overly thick and is difficult to further process. Reducing the final temperature to which the slurry is cooled also increases yield, presumably because the solubility of hydrated magnesium hexaborate decreases as temperature decreases.

The present invention will be described in further detail with reference to the following examples. However, it should be understood that the present invention is by no means restricted to such specific examples.

Examples 1 and 2

$MgB_6O_{10}.5H_2O$ Preparation

Two initial samples of $MgB_6O_{10}.5H_2O$ were prepared using 200 ml of de-ionized water, 86.8 grams of boric acid, and 18.0 grams of $MgCO_3$. The ratio of boric acid to de-ionized water in these examples was approximately the same as that used for the $[2(Sr,Eu)B_6O_{10}.5H_2O+SrCO_3/Eu_2O_3]$ precipitation in U.S. Pat. Nos. 4,719,033 and 5,068,055 (86.8 grams/200 ml $H_2O$ vs. 87.07 grams/200 ml $H_2O$). The boric acid was added to the water, agitated, and heated to 90 to 95° C. before the $MgCO_3$ was slowly added. After addition was complete, the samples were digested for 1 hour at 90 to 95° C. and then quickly cooled to <50° C. During digestion, one sample was pH adjusted to 7.5 by $NH_4OH$ addition and the other was pH adjusted to 8.5 through $NH_4OH$ addition. The precipitate samples were filtered and dried for 36 hours at 135° C., and then screened –60 mesh. The sample adjusted to a pH of 7.5 had a 21% yield, while the sample adjusted to a pH of 8.5 had a 46.5% yield. X-ray diffraction confirmed that both samples were primarily $MgB_6O_{10}.5H_2O$ and the weight loss after heating both samples at 600° C. for 2 hours indicated 5.10 waters of hydration in both. Similar precipitations were attempted using MgO and $Mg(OH)_2$ as reactants resulting in low yields of 2.9% and 9.1% respectively.

Example 3

A third sample was made in similar fashion with higher concentrations of boric acid and magnesium carbonate: 200 ml of water, 158.4 grams of boric acid, and 30.50 grams of $MgCO_3$. This sample was digested for 4 hours at 85 to 90° C. with a final pH of 6.2, before filtration and drying. This yield was 83.7%.

Examples 4 and 5

Additional samples were made to optimize the reaction conditions at larger quantities. The 4$^{th}$ sample was made with a 6:1 boric acid/magnesium carbonate molar ratio and the 5$^{th}$ sample made with a 7:1 ratio. The 4$^{th}$ sample was made using 158.4 grams $H_3BO_3$, 36.0 grams $MgCO_3$, and 200 ml of de-ionized water, while the 5$^{th}$ sample was made using 187.0 grams $H_3BO_3$, 36.0 grams of $MgCO_3$, and 200 mls of water. Both samples were digested for 5 hours at 90 to 95° C., then cooled to 50° C., and filtered. These samples were dried at about 120° C. for 36 hours and water loss at 600° C. indicated 5.10 waters of hydration for both. The 6:1 sample had a 72.4% yield, while the 7:1 sample had a 71.8% yield.

Examples 6 to 9

The next 4 samples were made using 1500 ml of de-ionized water and heated to 90 to 95° C. The 6$^{th}$ sample was made using 1188 grams $H_3BO_3$ and 270 grams $MgCO_3$ and the 7$^{th}$ sample was made using 792 grams $H_3BO_3$ and 180 grams of $MgCO_3$. Both samples were made by incrementally adding $H_3BO_3$ and $MgCO_3$. The 6$^{th}$ sample was nearly colorless (no observable precipitate) after 900 grams of $H_3BO_3$ and 185 grams of $MgCO_3$ had been added. When the additional 288 grams of $H_3BO_3$ and 85 grams of $MgCO_3$ had been added, the precipitate slurry was very thick and the agitator nearly stopped moving. A small quantity of water was added to make agitation easier. The 7$^{th}$ sample was a thin slurry after the boric acid and magnesium carbonate had been added, but thickened slightly as some water evaporated. Both of these samples were digested for 1 hour at 90° C., then 1 hour at 80° C., then cooled over 30 minutes to 55° C., and digested for 2 hours at 55° C. Both samples, the 7$^{th}$ sample in particular, thickened considerably as the digestion temperature was reduced. The 6$^{th}$ sample had a 91.1% yield and the 7$^{th}$ sample a 83.5% yield, with 5.16 and 5.17 waters of hydration respectively after drying.

The 8$^{th}$ sample was made using 874.87 grams of $H_3BO_3$ and 198.83 grams of $MgCO_3$, and the 9$^{th}$ sample was made using 984.25 grams of $H_3BO_3$ and 223.69 grams of $MgCO_3$ with 1500 mls of de-ionized water at about 90° C. Both of these samples were digested for 1 hour at 90° C., then 1 hour at 80° C., then 1 hour at 70° C., and then cooled to 50° C. The 8$^{th}$ sample had a 88.2% yield and the 9$^{th}$ sample a 87.5% yield, with 5.05 and 5.06 waters of hydration respectively after drying.

Example 10

A large-scale precipitation was performed using a temperature-controlled steam-jacketed 30 gallon reactor. A 44.16 kg amount of boric acid and 20 gallons of de-ionized water were agitated and heated to 90° C. before 10.036 kg of $MgCO_3$ was slowly added (about 1 hour). The precipitate slurry was digested for approximately 1 hour at 80° C., then 1 hour at 70° C., and then 1 hour at 50° C., before it was sent to a crock and left under vacuum overnight to remove water. (The digestion times and temperatures are only approximate because the steam jacketed tank doesn't cool as well as it heats.) The temperature was reduced by manually flowing cooling water through the steam jacket to reach the targeted temperatures. The precipitate was transferred from the crock to a drying oven and dried at 250° F. for 2.5 days. After drying the $MgB_6O_{10}\cdot 5H_2O$ was easily crumbled by hand and could be sifted through a −60 mesh screen with little additional processing. This large-scale reaction produced a 85.4% yield and the dried precipitate was found to have 5.01 waters of hydration.

Examples 11

This sample was made in similar fashion as previous samples using 1150 grams of $H_3BO_3$ and 261.36 grams of $MgCO_3$ with 2000 ml of de-ionized water at about 90° C. This sample was digested for 1 hour at 90° C., then 1 hour at 80° C., then 1 hour at 70° C., and then cooled to 50° C. The yield was 84.2%.

The following tables 1 and 2 summarize the relevant weights, moles, and concentrations of $H_3BO_3$, $MgCO_3$, de-ionized water, pH when measured, addition and digestion conditions, and final yields for examples from 1 to 11.

TABLE 1

| Example | $H_3BO_3$ wt. | $MgCO_3$ wt. | $H_2O$ | Addition Temp (° C.) | Digestion Conditions | Yield (%) |
|---|---|---|---|---|---|---|
| 1 | 86.8 g | 18.0 g | 200 ml | 90-95 | 90-95° C. 1 hr pH = 7.5 | 21.0 |
| 2 | 86.8 g | 18.0 g | 200 ml | 90-95 | 90-95° C. 1 hr pH = 8.5 | 46.5 |
| 3 | 158.4 g | 30.5 g | 200 ml | 90-95 | 90° C. 4 hrs | 83.7 |
| 4 | 158.4 g | 36.0 g | 200 ml | 90-95 | 90-95° C. 5 hrs | 72.4 |
| 5 | 187.0 g | 36.0 g | 200 ml | 90-95 | 90-95° C. 5 hrs | 71.8 |
| 6 | 1188.0 g | 270.0 g | 1500 ml | ~90 | 90° C. 1 hr 80° C. 1 hr 55° C. 2 hrs | 91.1 |
| 7 | 792.0 g | 180.0 g | 1500 ml | ~90 | 90° C. 1 hr 80° C. 1 hr 55° C. 2 hrs | 83.5 |
| 8 | 874.9 g | 198.8 g | 1500 ml | ~90 | 90° C. 1 hr 80° C. 1 hr 70° C. 1 hr | 88.2 |
| 9 | 984.2 g | 223.7 g | 1500 ml | ~90 | 90° C. 1 hr 80° C. 1 hr 70° C. 1 hr | 87.5 |
| 10 | 44.16 kg | 10.036 kg | 75.71 liters (20 gal) | 90 ~1 hr | 80° C. 1 hr 70° C. 1 hr 50° C. 1 hr | 85.4 |
| 11 | 1150.0 g | 261.4 g | 2000 ml | ~90 | 90° C. 1 hr 80° C. 1 hr 70° C. 1 hr | 84.2 |

TABLE 2

| Example | millimoles/ml $H_2O$ $H_3BO_3$ | millimoles/ml $H_2O$ $MgCO_3$ | B/Mg Mole Ratio | Digestion Conditions | Yield (%) |
|---|---|---|---|---|---|
| 1 | 7.02 | 1.07 | 6.58 | 90-95° C. 1 hr pH = 7.5 | 21.0 |
| 2 | 7.02 | 1.07 | 6.58 | 90-95° C. 1 hr pH = 8.5 | 46.5 |
| 3 | 12.81 | 1.81 | 7.08 | 85-90° C. 4 hrs | 83.7 |
| 4 | 12.81 | 2.13 | 6.00 | 90-95° C. 5 hrs | 72.4 |
| 5 | 15.12 | 2.13 | 7.08 | 90-95° C. 5 hrs | 71.8 |
| 6 | 12.81 | 2.13 | 6.00 | 90° C. 1 hr 80° C. 1 hr 55° C. 2 hrs | 91.1 |
| 7 | 8.54 | 1.42 | 6.00 | 90° C. 1 hr 80° C. 1 hr 55° C. 2 hrs | 83.5 |
| 8 | 9.43 | 1.57 | 6.00 | 90° C. 1 hr 80° C. 1 hr 70° C. 1 hr | 88.2 |
| 9 | 10.61 | 1.77 | 6.00 | 90° C. 1 hr 80° C. 1 hr 70° C. 1 hr | 87.5 |

TABLE 2-continued

| | millimoles/ml H$_2$O | | B/Mg | Digestion | Yield |
|---|---|---|---|---|---|
| Example | H$_3$BO$_3$ | MgCO$_3$ | Mole Ratio | Conditions | (%) |
| 10 Pilot | 9.43 | 1.57 | 6.00 | 80° C. 1 hr<br>70° C. 1 hr<br>50° C. 1 hr | 85.4 |
| 11 | 9.30 | 1.55 | 6.00 | 90° C. 1 hr<br>80° C. 1 hr<br>70° C. 1 hr | 84.2 |

The most important differences between precipitation of MgB$_6$O$_{10}$.5H$_2$O and the [2(Sr,Eu)B$_6$O$_{10}$.5H$_2$O+SrCO$_3$/Eu$_2$O$_3$] precipitate disclosed in U.S. Pat. Nos. 4,719,033 and 5,068,055 include the reactant concentrations and the digestion temperatures.

MgB$_6$O$_{10}$.5H$_2$O is preferably prepared by reacting about 9 to about 10 millimoles of H$_3$BO$_3$/ml H$_2$O and about 1.5 to about 1.67 millimoles of MgCO$_3$/ml H$_2$O at about 90° C. and then digesting the precipitate for 3 hours at decreasing temperatures with at least 1 hour of digestion at 50 to 70° C.

The [2(Sr,Eu)B$_6$O$_{10}$.5H$_2$O+SrCO$_3$/Eu$_2$O$_3$] precipitate is prepared by reacting 7.04 millimoles of H$_3$BO$_3$/ml H$_2$O and 1.59 millimoles of (SrCO$_3$/Eu$_2$O$_3$)/ml H$_2$O, of which ⅓ is unreacted excess, at about 95° C. and then digesting the precipitate for 6 hours at >85° C.

Observation suggests that MgB$_6$O$_{10}$.5H$_2$O has a significant solubility in water while (Sr,Eu)B$_6$O$_{10}$.5H$_2$O has only slight solubility in water. The equipment used to make MgB$_6$O$_{10}$.5H$_2$O can be cleaned by merely soaking in water. Increasing the concentrations of H$_3$BO$_3$ and MgCO$_3$ tended to increase the yield of the precipitate, but when the concentrations are too high as in sample 6 the precipitate becomes overly thick and is difficult to further process. Reducing the temperature during digestion also increases yield, presumably because the solubility of MgB$_6$O$_{10}$.5H$_2$O decreases as temperature decreases. Comparison of samples 5 and 7 indicate that reducing the digestion temperature is more important than increasing the reactant concentrations for improving yield. Another method to increase yield requires the addition of NH$_4$OH to raise the pH during digestion. This is thought to be unnecessary when the concentrations of reactants are high and the digestion temperature is slowly lowered. A further difference between the two precipitation reactions includes the B/Mg and B/(Sr,Eu) ratios. For MgB$_6$O$_{10}$.5H$_2$O, there is little difference in yield when the B/Mg molar ratio is 7.08:1 or 6.00:1 (samples 4 and 5) under similar reaction conditions. This is likely due to the fact that MgB$_6$O$_{10}$.5H$_2$O is partially water soluble and excess boron does not drive the precipitation to completion. For the (Sr,Eu)B$_6$O$_{10}$.5H$_2$O precipitation reaction, excess boron does appear to drive the precipitation to completion. Although the reactants are similar to those used for the [2(Sr,Eu)B$_6$O$_{10}$.5H$_2$O+SrCO$_3$/Eu$_2$O$_3$] precipitation process, higher concentrations and digestion at reduced temperatures are important to increase the yield for this reaction. The reduced digestion temperature has been experimentally determined to have little effect upon yield for [2(Sr,Eu)B$_6$O$_{10}$.5H$_2$O+SrCO$_3$/Eu$_2$O$_3$] precipitation and is, in fact, detrimental to the finished phosphor properties.

Example 12

(Gd,Y,Ce,Pr)MgB$_5$O$_{10}$ Synthesis

In this example, several (Gd$_{0.45}$,Y$_{0.49}$,Ce$_{0.05}$,Pr$_{0.01}$)MgB$_5$O$_{10}$ phosphors were synthesized using the MgB$_6$O$_{10}$.5H$_2$O precipitate prepared in Example 10 with different amounts of magnesium carbonate. Boric acid was used to prepare the comparative control sample. The detailed procedures for preparing the control sample are described in U.S. Pat. No. 7,288,215, which is incorporated herein by reference. To optimize the blend ratio of raw materials, each sample was formulated to contain 1.0 mole of (Gd$_2$O$_3$+Y$_2$O$_3$+CeO$_2$+Pr$_4$O$_7$) and 1.0 mole of (MgCO$_3$+MgB$_6$O$_{10}$.5H$_2$O). The mole ratio of Gd$_2$O$_3$,Y$_2$O$_3$, CeO$_2$, and Pr$_4$O$_7$ is kept constant at 0.45:0.49:0.05:0.01. It is necessary to adjust the amounts of MgCO$_3$ versus MgB$_6$O$_{10}$.5H$_2$O precipitate to obtain a (Gd$_{0.45}$,Y$_{0.49}$,Ce$_{0.05}$,Pr$_{0.01}$)MgB$_5$O$_{10}$ phosphor and optimal brightness. Table 3 lists the raw materials, their mole ratios, the quantities used for inventive samples 12-1 to 12-4, and the finished phosphor brightness.

The materials were weighed, added to a 1000 ml plastic bottle, and then thoroughly blended on a paint shaker. The mixture was then fired in an alumina crucible for 3.0 hours at 1030° C. in a slightly reducing 99% N$_2$/1% H$_2$ atmosphere. The fired cake was wet milled with 5 mm YTZ beads for 30 minutes, washed, filtered, dried, and screened to −300 mesh to produce the (Gd$_{0.45}$,Y$_{0.49}$,Ce$_{0.05}$,Pr$_{0.01}$)MgB$_5$O$_{10}$ phosphor. Phosphor samples were packed into plaques and excited by 254 nm radiation from a mercury discharge. The peak emission of each sample was measured at 312 nm and compared to a standard (Gd$_{0.45}$,Y$_{0.49}$,Ce$_{0.05}$,Pr$_{0.01}$)MgB$_5$O$_{10}$ phosphor prepared according to U.S. Pat. No. 7,288,215. Emission spectra of all samples are compared in FIG. 1. The data indicate that the phosphor peak brightness was continuously improved by increasing the molar concentration of MgB$_6$O$_{10}$.5H$_2$O and decreasing the molar concentration of MgCO$_3$. The highest peak brightness is obtained when phosphor was prepared with 1.0 mole of MgB$_6$O$_{10}$.5H$_2$O precipitate and 1.0 mole of the (Gd$_2$O$_3$+Y$_2$O$_3$+CeO$_2$+Pr$_4$O$_7$) rare earth material.

TABLE 3

| | Weight of Raw Material, grams | | | | | | Rel. Brightness Peak Height |
|---|---|---|---|---|---|---|---|
| Sample | Gd$_2$O$_3$ | Y$_2$O$_3$ | CeO$_2$ | Pr$_4$O$_7$ | MgCO$_3$ | MgB$_6$O$_{10}$•5H$_2$O | @ 312 nm, % |
| Control | Comparative (Gd$_{0.45}$, Y$_{0.49}$, Ce$_{0.05}$, Pr$_{0.01}$)MgB$_5$O$_{10}$ | | | | | | 100 |
| 12-1 | 50.62 | 34.60 | 5.33 | 1.05 | 8.73 | 175.20 | 94.4 |
| Mole Ratio | 0.45 | 0.49 | 0.05 | 0.01 | 0.167 | 0.833 | |
| 12-2 | 50.62 | 34.60 | 5.33 | 1.05 | 6.53 | 184.03 | 98.6 |
| Mole Ratio | 0.45 | 0.49 | 0.05 | 0.01 | 0.125 | 0.875 | |

TABLE 3-continued

| Sample | Weight of Raw Material, grams | | | | | | Rel. Brightness Peak Height @ 312 nm, % |
|---|---|---|---|---|---|---|---|
| | $Gd_2O_3$ | $Y_2O_3$ | $CeO_2$ | $Pr_4O_7$ | $MgCO_3$ | $MgB_6O_{10} \cdot 5H_2O$ | |
| 12-3 | 50.62 | 34.60 | 5.33 | 1.05 | 4.34 | 192.87 | 103.2 |
| Mole Ratio | 0.45 | 0.49 | 0.05 | 0.01 | 0.083 | 0.917 | |
| 12-4 | 50.62 | 34.60 | 5.33 | 1.05 | 0 | 210.33 | 109.8 |
| Mole Ratio | 0.45 | 0.49 | 0.05 | 0.01 | 0 | 1.0 | |

Example 13

Figure 2:
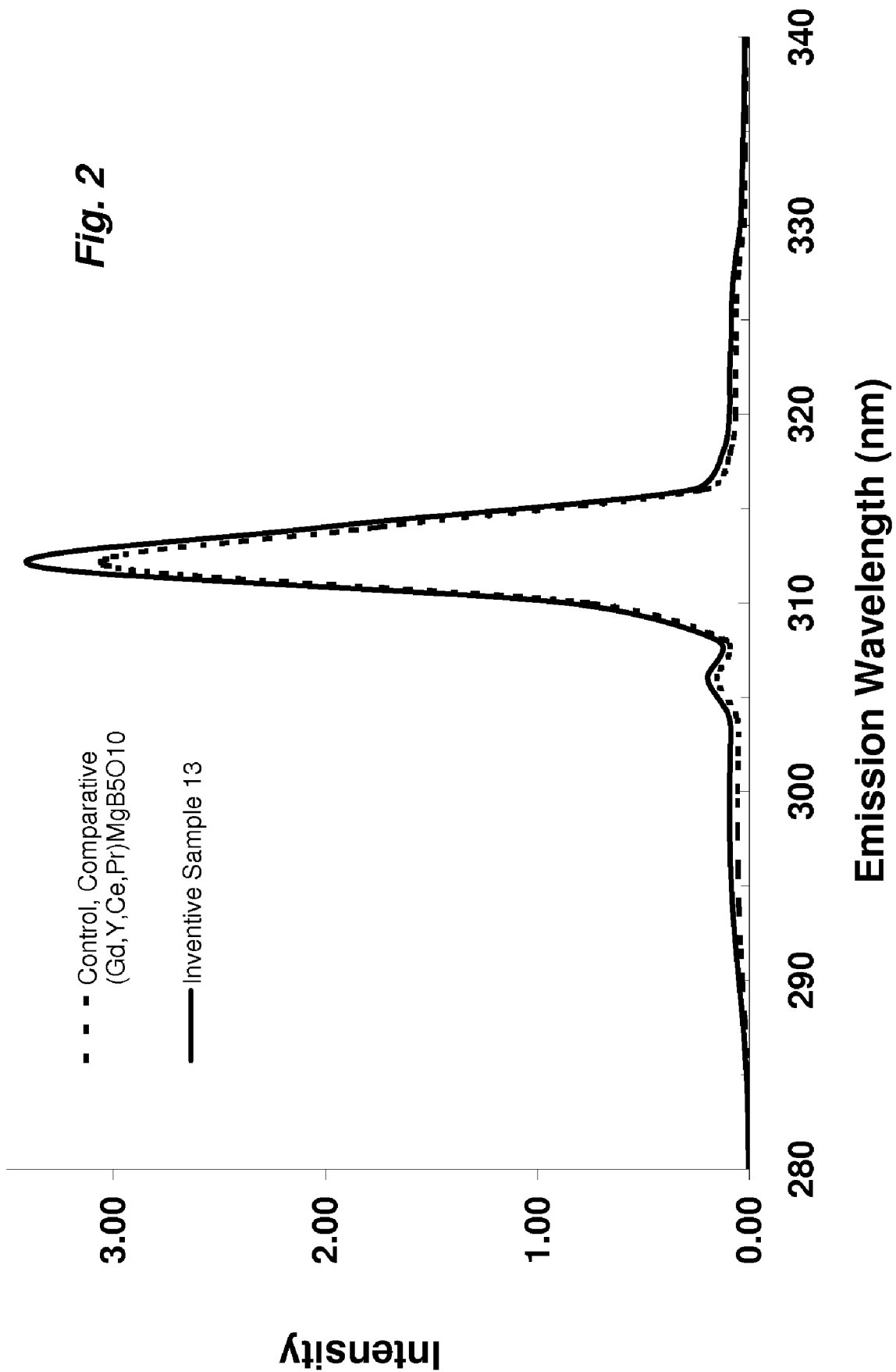
FIG. 2 shows the emission spectra between 280 nm and 340 nm of a standard $(Gd_{0.45},Y_{0.49},Ce_{0.05},Pr_{0.01})MgB_5O_{10}$ phosphor and the phosphor in Example 13.

To verify the results obtained in Example 12, a larger batch of $(Gd_{0.45}Y_{0.49}Ce_{0.05}Pr_{0.01})MgB_5O_{10}$ phosphor was prepared exactly as sample 12-4 in the previous example. A 2459.45 gram amount of $MgB_6O_{10} \cdot 5H_2O$ prepared in Example 10 was thoroughly mixed with 591.98 grams of $Gd_2O_3$, 404.55 grams of $Y_2O_3$, 62.35 grams of $CeO_2$, and 12.25 grams of $Pr_4O_7$. The mixture was fired and prepared as in Example 12. Table 4 summarizes the raw materials and compares the relative peak brightness of finished phosphor with the standard $(Gd_{0.45},Y_{0.49},Ce_{0.05},Pr_{0.01})MgB_5O_{10}$ phosphor prepared according to U.S. Pat. No. 7,288,215. The data confirm that the $(Gd_{0.45},Y_{0.49},Ce_{0.05},Pr_{0.01})MgB_5O_{10}$ phosphor made with the $MgB_6O_{10} \cdot 5H_2O$ precipitate has a higher relative peak brightness than the comparative sample prepared according to U.S. Pat. No. 7,288,215. As can be seen in FIG. 2, the 312 nm emission intensity of sample 13 is significantly higher than that of comparative sample made with boric acid.

TABLE 4

| Sample | Weight of Raw Material, grams | | | | | Rel. Brightness Peak Height @ 312 nm, % |
|---|---|---|---|---|---|---|
| | $Gd_2O_3$ | $Y_2O_3$ | $CeO_2$ | $Pr_4O_7$ | $MgB_6O_{10} \cdot 5H_2O$ | |
| Control | Comparative $(Gd_{0.45}, Y_{0.49}, Ce_{0.05}, Pr_{0.01})MgB_5O_{10}$ | | | | | 100 |
| 13 | 591.98 | 404.55 | 62.35 | 12.25 | 2459.45 | 111.5 |
| Mole Ratio | 0.45 | 0.49 | 0.05 | 0.01 | 1.0 | |

While there have been shown and described what are presently considered to be the preferred embodiments of the invention, it will be apparent to those skilled in the art that various changes and modifications can be made herein without departing from the scope of the invention as defined by the appended claims. In particular, although a single-step firing process is preferred, the process may less advantageously include additional firing steps.

We claim:

1. A method of producing a UV-emitting magnesium pentaborate phosphor comprising:
   (a) combining a hydrated magnesium hexaborate with oxides of Y, Gd, Ce, and Pr to form a mixture; and
   (b) firing the mixture in a slightly reducing atmosphere to form the phosphor.

2. The method of claim 1 wherein the hydrated magnesium hexaborate has a formula $MgB_6O_{10} \cdot XH_2O$ where X is from 4 to 6.

3. The method of claim 2 wherein X is 4.8 to 5.5.

4. The method of claim 2 wherein X is about 5.

5. The method of claim 1 wherein the phosphor has a formula $(Y_{1-x-y-z}Gd_xCe_yPr_z)MgB_5O_{10}$, where x has a value from 0.02 to 0.80, y has a value from 0.01 to 0.97, and z has a value from 0 to 0.05 and $x+y+z<1$.

6. The method of claim 5 wherein x has a value from 0.3 to 0.6, y has a value from 0.02 to 0.2, and z has a value from 0.002 to 0.02.

7. The method of claim 1 wherein the mixture is fired at a temperature from about 1020° C. to about 1060° C. in a 99% $N_2$/1% $H_2$ atmosphere.

8. The method of claim 1 wherein the hydrated magnesium hexaborate is formed by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour.

9. The method of claim 8 wherein the boric acid solution contains about 6.0 to about 12.0 millimoles of boric acid per 1.0 milliliter of water and about 1.0 to about 2.0 millimoles of magnesium carbonate per 1.0 milliliter water is added.

10. The method of claim 8 wherein the boric acid solution contains about 9.0 to about 10.0 millimoles of boric acid per 1.0 milliliter of water and about 1.5 to about 1.67 millimoles of magnesium carbonate per 1.0 milliliter water is added.

11. The method of claim 9 wherein the molar ratio of $H_3BO_3$ to $MgCO_3$ is 5.75 to 6.25.

12. The method of claim 9 wherein the molar ratio of $H_3BO_3$ to $MgCO_3$ is about 6.0.

13. A method of producing a UV-emitting $(Y_{1-x-y-z}Gd_xCe_yPr_z)MgB_5O_{10}$ phosphor, where x has a value from 0.02 to 0.80, y has a value from 0.01 to 0.97, and z has a value from 0 to 0.05 and $x+y+z<1$, the method comprising:
   (a) combining a hydrated magnesium hexaborate with oxides of Y, Gd, Ce, and Pr to form a mixture, the hydrated magnesium hexaborate having a formula $MgB_6O_{10} \cdot XH_2O$ where X is from 4 to 6; and
   (b) firing the mixture at a temperature of from about 1020° C. to about 1060° C. in a slightly reducing atmosphere to form the phosphor.

14. The method of claim 13 wherein x has a value from 0.3 to 0.6, y has a value from 0.02 to 0.2, and z has a value from 0.002 to 0.02.

15. The method of claim 13 wherein the hydrated magnesium hexaborate is formed by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour.

16. The method of claim 15 wherein the boric acid solution contains about 6.0 to about 12.0 millimoles of boric acid per 1.0 milliliter of water and about 1.0 to about 2.0 millimoles of magnesium carbonate per 1.0 milliliter water is added.

17. The method of claim 15 wherein the boric acid solution contains about 9.0 to about 10.0 millimoles of boric acid per 1.0 milliliter of water and about 1.5 to about 1.67 millimoles of magnesium carbonate per 1.0 milliliter water is added.

18. The method of claim 16 wherein the molar ratio of $H_3BO_3$ to $MgCO_3$ is 5.75 to 6.25.

19. The method of claim 13 wherein X is 4.8 to 5.5.

20. The method of claim 13 wherein X is about 5.

21. The method of claim 18 wherein X is 4.8 to 5.5.

22. The method of claim 18 wherein X is about 5.

* * * * *